(No Model.)

S. W. ASHMEAD.
ANTI-FRICTION BEARING.

No. 426,701.  Patented Apr. 29, 1890.

WITNESSES:
Chas. Nida
C. Sedgwick

INVENTOR:
S. W. Ashmead
BY Munn & Co.
ATTORNEYS.

THE NORRIS PETERS CO., PHOTO-LITHO., WASHINGTON, D. C.

UNITED STATES PATENT OFFICE.

SEELY W. ASHMEAD, OF ST. LOUIS, MISSOURI, ASSIGNOR OF ONE-THIRD TO THOMAS B. CREWS AND JOSEPH M. O'SHEA, OF SAME PLACE.

ANTI-FRICTION BEARING.

SPECIFICATION forming part of Letters Patent No. 426,701, dated April 29, 1890.

Application filed August 1, 1889. Serial No. 319,403. (No model.)

*To all whom it may concern:*

Be it known that I, SEELY WILLIAMS ASHMEAD, of St. Louis, in the State of Missouri, have invented a new and Improved Anti-Friction Bearing, of which the following is a full, clear, and exact description.

My invention relates to an anti-friction bearing adapted for use in connection with railway freight and passenger cars, engines, tenders, or other carriages or cars used upon any steam or rapid-transit railway, or on turn-tables or vehicles or any machinery requiring a simple, durable, and readily-applied thoroughly anti-friction bearing.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
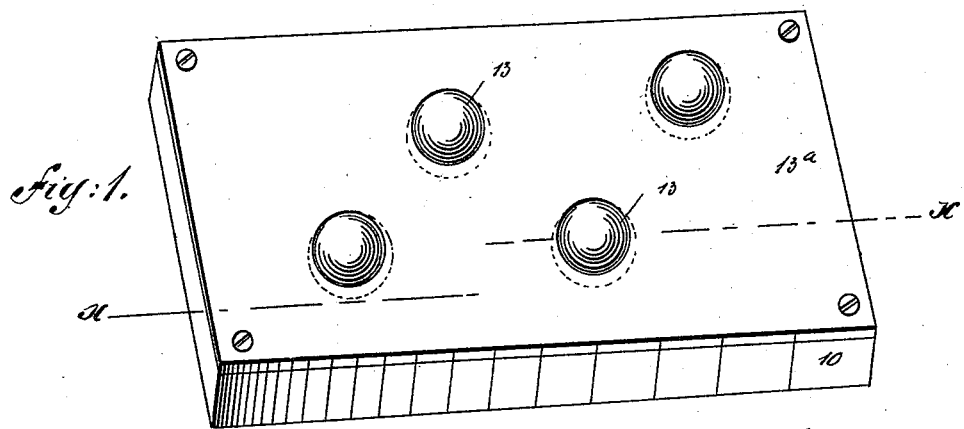
Figure 2:
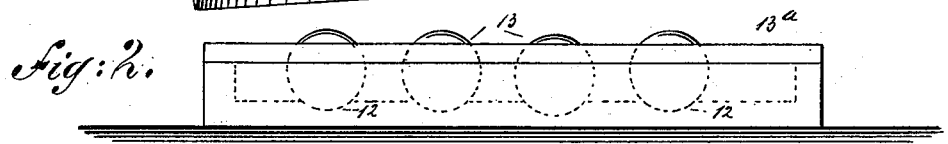
Figure 3:
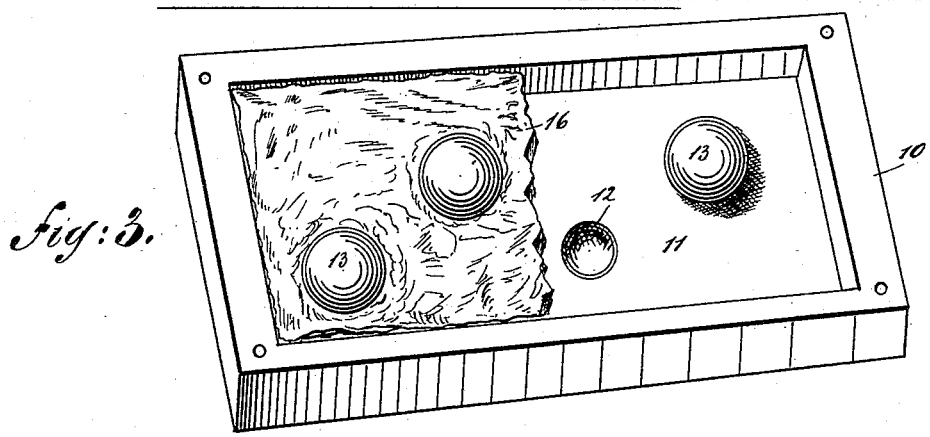
Figure 4:
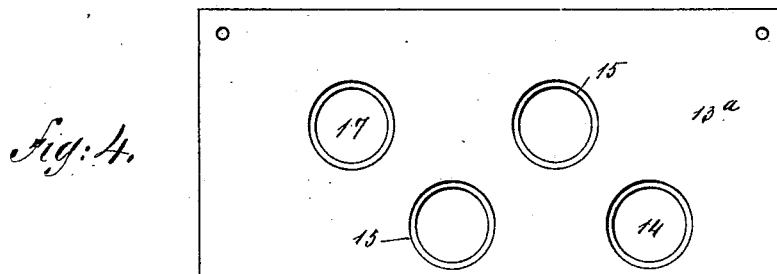
Figure 5:
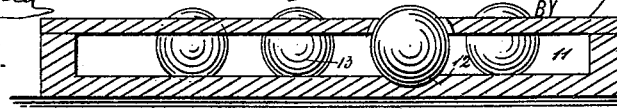

Figure 1 is a perspective view of the complete bearing. Fig. 2 is a side elevation. Fig. 3 is a perspective view of the body or base with the cover removed. Fig. 4 is a bottom plan view of the cover, and Fig. 5 is a section on line $x$ $x$ of Fig. 1.

The improved bearing is constructed as follows: The base or body 10 consists of a block of metal or other suitable hard material, one face of which block is hollowed out or provided with a recess 11 of any desired depth, usually about one inch, and in the base-wall of said recess a number of depressions 12 are produced, shaped to a section of a sphere.

In each depression 12 a ball 13 is made to rest, about an inch in diameter or any required size, the balls being made of chilled iron, steel, or other metal or hard substance. Fitting on and covering this recess in the base or body 10 is placed and secured a steel or iron plate $13^a$, in which there are circular openings 14, corresponding in size and position to the depressions in the base-wall of the recess 11. The apertured cover is so placed upon the body that a small section of a ball will project through each opening or aperture 14 above the outer face of the box, as shown in Fig. 2. The inner surface of the cover around each aperture or opening 14 is chamfered or beveled, as shown at 15 in Fig. 4, to permit the easy revolution of the balls in the box. The recess or chamber 11, hollowed out of the body of the box, is ordinarily filled in around the balls with "waste," as shown at 16, and the plate or cover $13^a$ is rigidly attached to the body by rivets or other equivalent form of fastening device.

An oil-hole may be made in the bearings at any convenient point, through which the chamber 11 may be supplied with oil, and it is obvious that when oil has been placed in the chamber 11 the balls will be kept constantly lubricated for a long period of time. The balls are preferably arranged, as shown in the drawings, in pairs and diagonally of the body; but I do not confine myself to this arrangement or to any particular number of balls.

The car-bed or upper structure resting on the projecting balls will turn easily on the bearings and allow the truck to turn and follow the curve of the road, and avoid the strain on flanges and trucks that results from the bearings now in use.

Although I have described my invention as specially adapted for use in connection with railway rolling-stock, I desire it be understood the device may be employed with an equally good effect upon any article of manufacture or machine requiring anti-friction bearings.

Having thus described my invention, what I claim as new, and desire to secure by Letters Patent, is—

1. An anti-friction bearing consisting in a box having an imperforate bottom provided in its upper face with a series of superficial depressions, a lid secured to and closing the top of the box and provided with a series of openings corresponding with said recesses in number and position, and a series of balls resting in said depressions and projecting through the cover-apertures, substantially as set forth.

2. In an anti-friction bearing, the combination, with a box provided with a series of depressions in one inner face arranged in pairs and diagonally of said face, and a lid or cover provided with openings corresponding in location and number with the said depressions, of a ball located in each depression and extending through the opposed cover-aperture, substantially as shown and described.

SEELY W. ASHMEAD.

Witnesses:
   THO. B. CREWS,
   MATTHEW RYAN.